(12) United States Patent
Ochsmann et al.

(10) Patent No.: US 11,207,671 B2
(45) Date of Patent: Dec. 28, 2021

(54) MIXTURES FOR THE ADSORPTION OF ACIDIC GASES

(71) Applicant: LANXESS DEUTSCHLAND GMBH, Cologne (DE)

(72) Inventors: Christian Ochsmann, Pyrbaum (DE); Stefan Neumann, Leverkusen (DE)

(73) Assignee: LANXESS Deutschland GmbH, Cologne (DE)

( * ) Notice: Subject to any disclaimer, the term of this patent is extended or adjusted under 35 U.S.C. 154(b) by 3 days.

(21) Appl. No.: 16/624,340

(22) PCT Filed: May 17, 2018

(86) PCT No.: PCT/EP2018/062933
§ 371 (c)(1),
(2) Date: Dec. 19, 2019

(87) PCT Pub. No.: WO2018/233949
PCT Pub. Date: Dec. 27, 2018

(65) Prior Publication Data
US 2021/0162396 A1    Jun. 3, 2021

(30) Foreign Application Priority Data

Jun. 19, 2017 (EP) .................................... 17176521

(51) Int. Cl.
| | | |
|---|---|---|
| B01J 41/07 | (2017.01) | |
| B01J 41/14 | (2006.01) | |
| B01J 47/018 | (2017.01) | |
| B01D 53/62 | (2006.01) | |
| B01D 53/81 | (2006.01) | |
| B01D 53/96 | (2006.01) | |

(52) U.S. Cl.
CPC ............. B01J 41/07 (2017.01); B01D 53/62 (2013.01); B01D 53/81 (2013.01); B01D 53/96 (2013.01); B01J 41/14 (2013.01); B01J 47/018 (2017.01); B01D 2253/206 (2013.01); B01D 2253/304 (2013.01); B01D 2253/308 (2013.01); B01D 2257/504 (2013.01)

(58) Field of Classification Search
CPC . B01J 41/07; B01J 41/14; B01J 47/018; B01J 41/00; B01D 53/62; B01D 53/81; B01D 53/96; B01D 2257/504; F28D 2021/0019; F28D 2021/0022; F28D 2021/0028
See application file for complete search history.

(56) References Cited

U.S. PATENT DOCUMENTS

| | | | |
|---|---|---|---|
| 2,882,254 A | | 4/1959 | Kloepfer et al. |
| 3,240,724 A | | 3/1966 | Moody |
| 3,627,478 A | * | 12/1971 | Tepper ................... B01D 53/02 423/230 |
| 4,908,137 A | * | 3/1990 | Chen ...................... B01D 15/00 210/679 |
| 7,053,129 B1 | | 5/2006 | Klipper et al. |
| 7,678,865 B2 | | 3/2010 | Klipper et al. |
| 9,073,002 B2 | | 7/2015 | Raatschen et al. |
| 9,302,221 B2 | | 4/2016 | Wennergren et al. |
| 2011/0088550 A1 | | 4/2011 | Tirio |
| 2012/0228553 A1 | | 9/2012 | Tirio |

FOREIGN PATENT DOCUMENTS

| | | |
|---|---|---|
| DE | 19653758 A1 | 6/1998 |
| EP | 1000660 B1 | 3/2005 |
| EP | 1945341 A1 | 7/2008 |
| WO | WO0002643 A1 | 1/2000 |

OTHER PUBLICATIONS

International Search Report from corresponding International Application No. PCT/EP2018/ 062933, dated Jun. 6, 2018, three pages.
Veneman, R. (2015) "Adsorptive systems for post-combustion CO2 capture: design, experimental validation and evaluation of a supported amine based process", thesis, http://doc.utwente.nl/97198/ (pp. 147-184), Abstract.

* cited by examiner

*Primary Examiner* — Timothy C Vanoy
(74) *Attorney, Agent, or Firm* — Nicanor A. Kohncke; Christoper L. McDavid; Ewa M. Wozniak

(57) ABSTRACT

The invention relates to mixtures containing basic anion exchangers and flow regulators, the use thereof for the adsorption of acidic gases and of carbon dioxide in particular, a process for continuous gas adsorption, and heat exchangers that contain the mixtures containing basic anion exchangers and flow regulators.

13 Claims, 1 Drawing Sheet

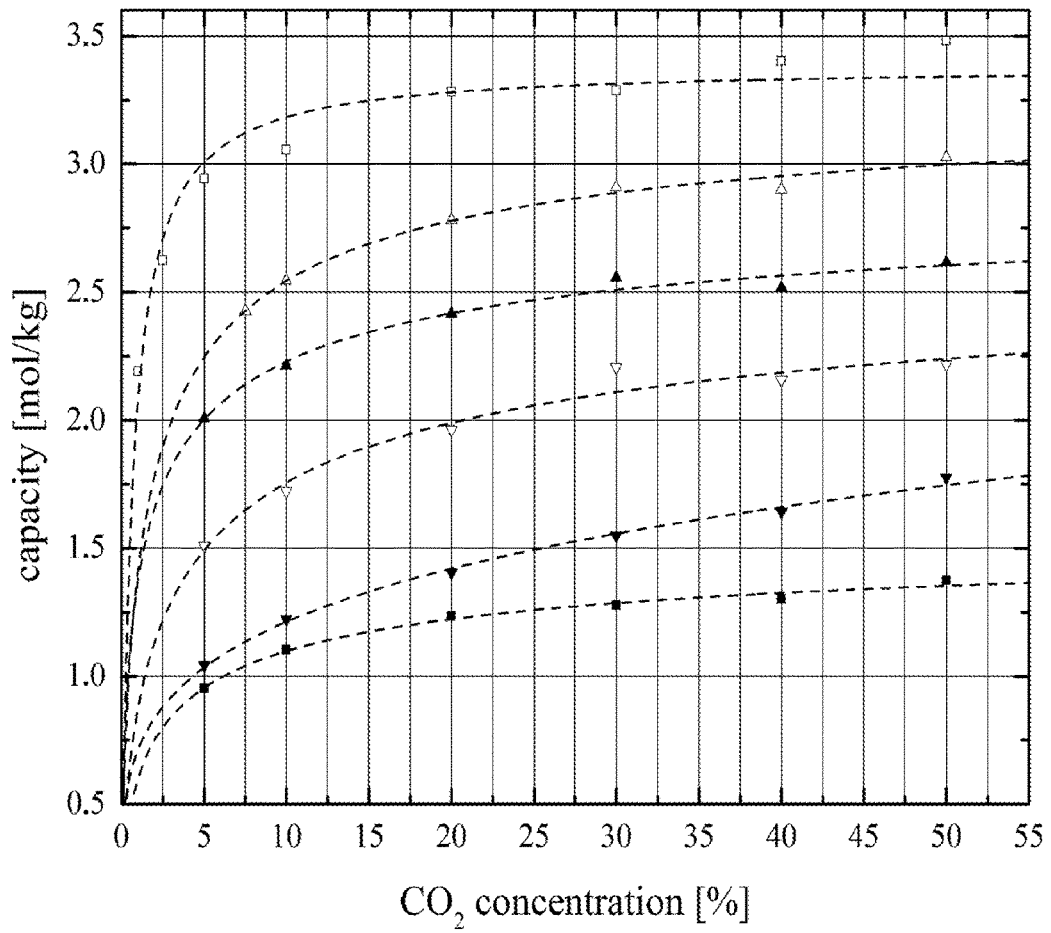
Adsorption isotherms of the inventive mixture of a macroporous basic anion exchanger comprising a styrene/divinylbenzene copolymer having primary amino groups and 0.4% by weight of graphite.

MIXTURES FOR THE ADSORPTION OF ACIDIC GASES

The invention relates to mixtures containing basic anion exchangers and flow regulators, the use thereof for the adsorption of acidic gases and of carbon dioxide in particular, a process for continuous gas adsorption, and heat exchangers that contain the mixtures containing basic anion exchangers and flow regulators.

For the removal of $CO_2$ from biogas, there are currently primarily three types of process known: the absorptive process, the permeation process, and the adsorptive process. In the absorptive process, which is employed in the majority of plants in Germany, a further distinction must be made between physical scrubbing with water, Selexol®, Genosorb®, methanol (Rectisol process) or chemical scrubbing, primarily with the amines monoethylamine (MEA), diethylamine (DEA), and monodiethanolamine (MDEA). The permeation process uses a membrane that is permeable only to $CO_2$. The adsorbers used for the adsorption of $CO_2$ from a gas stream are either a carbon molecular sieve, a zeolite, activated charcoal or another solid, impregnated for example with amines, that is able to physically or chemically bind $CO_2$. In addition to the listed adsorbers, ion exchangers can also be used to bind $CO_2$ and other acidic gases.

WO-A-12/045442 discloses the use of ion exchangers in an adsorber column for separating carbon dioxide from biogas, which is alternately loaded and regenerated. Regeneration of the ion exchanger is carried out by "flushing" the ion exchanger with a flushing medium, for example air. This flushing medium can be moderately preheated for the desired regeneration by means of a heat exchanger.

US-A-20120228553 discloses the use of weakly basic anion exchangers for the adsorption of $CO_2$ from industrial gas streams. After adsorption, the ion exchanger is regenerated by variation of the temperature "temperature swing" or by a combination of temperature "temperature swing" and pressure variation "pressure swing". US-A-20120228553 likewise describes that the ion exchanger bed used ideally has a water content from 1% by weight to 25% by weight based on the total weight of the wet ion exchanger.

WO-A-00/02643 describes a regenerative process for the adsorption of $CO_2$. This uses a macroporous ion exchanger containing primary benzylamine groups. The process removes from respired air the carbon dioxide that is being continuously produced through metabolism. The $CO_2$-rich air is directed by a blower through a bed of ion-exchanger resin. On flowing through the bed, the $CO_2$ molecules bind to the primary benzylamine functional groups, with corresponding depletion of the medium flowing through.

WO-A-13/104364 describes the adsorption of $CO_2$ from a gas stream through an ion exchanger bed. The ion exchangers here have a water content of more than 35% based on the total weight of ion exchangers and water. The increased water content has no adverse effect on the ability of a resin bed to bind $CO_2$, but conversely displays a markedly improved ability to take up $CO_2$.

What all the above processes have in common is that they are directed to discontinuous gas adsorption processes, that is to say processes in which the ion exchanger is stored essentially statically in a reactor where it is brought into contact with the gas to be adsorbed. This process gives rise to a high heat of adsorption, which results in a reduction in the adsorption capacity of the anion exchangers and is a drawback of such processes for economic reasons in particular.

In addition to the discontinuous gas adsorption process described above, there likewise exist continuous processes. A continuous gas adsorption process is known, for example, from Veneman, R. (2015) "Adsorptive systems for post-combustion $CO_2$ capture: design, experimental validation and evaluation of a supported amine based process", thesis, http://doc.utwente.nl/97198/ (pp. 147-184).

In a continuous gas adsorption process, the ion exchanger undergoes continuous passage through a heat exchanger during gas adsorption. Up to now it has not been possible to adequately dissipate the heat of adsorption from these heat exchangers, which hindered the gas adsorption and desorption process and meant that the adsorption capacity of the ion exchangers used was unsatisfactory. In addition, blockages occur in the heat exchanger inflow and outflow lines that hinder the use of ion exchangers in the heat exchangers.

With the present invention, comprising at least one basic anion exchanger that has a water content of 0% by weight to 60% by weight based on the total mass of the ion exchanger and a mean particle diameter of 100 to 1000 µm, plus at least one flow regulator that is different to the basic anion exchangers and has a mean particle diameter of 1 nm to 1000 µm, it is now possible to produce mixtures that surprisingly have excellent sorption properties for acidic gases, and for carbon dioxide in particular, and can at the same time be used in continuous gas adsorption processes.

The invention therefore relates to mixtures containing at least one basic anion exchanger that has a water content of 0% by weight to 60% by weight based on the total mass of the ion exchanger and a mean particle diameter of 100 to 1000 µm, plus at least one flow regulator that is different to the basic anion exchangers and has a mean particle diameter of 1 nm to 1000 µm.

Basic anion exchangers and the preparation thereof are known from the prior art. In this regard, we refer in particular to EP-B-1000660 for the preparation of monodisperse, gel-type anion exchangers and the functionalization thereof and to EP-B-1078688 for the preparation of monodisperse, macroporous anion exchangers and the functionalization thereof. Basic anion exchangers consist preferably of an organic polymer functionalized with basic groups. The polymer in basic anion exchangers is preferably a crosslinked polystyrene and/or polyacrylate copolymer and is also termed a bead polymer. More preferably, the polymer in basic anion exchangers is a styrene/divinylbenzene crosslinked copolymer.

The degree of crosslinking of the polymer in basic anion exchangers is generally 1% to 80%, preferably 2% to 25%, based on the total amount of polymerizable monomers used. More preferably, the degree of crosslinking based on the total amount of polymerizable monomers used is 2% to 10%.

In the present preferable case in which the basic anion exchanger is a styrene/divinylbenzene crosslinked copolymer, the monomers are styrene and divinylbenzene.

In the mixtures according to the invention, microporous or gel-type/macroporous basic anion exchangers may be used.

The terms microporous or gel-type/macroporous are known from the technical literature, for example from Adv. Polymer Sci., vol. 5, pages 113-213 (1967).

In the context of the invention, the term macroporous is to be understood as meaning that the basic anion exchanger has a mean pore diameter of preferably 100 to 900 ångströms, more preferably of 100 to 550 ångströms.

The basic anion exchangers preferably have a macroporous structure. They are obtained through the addition of porogens to the monomer/crosslinker mixture, as described by way of example in Seidl et al., Adv. Polym. Sci., vol. 5 (1967), pp. 113-213.

Preference is given to the use of macroporous basic anion exchangers.

The basic anion exchangers to be used in the mixture according to the invention may be present in heterodisperse or monodisperse form.

In the present application, the term monodisperse describes materials in which at least 90% by volume or 90% by mass of the particles have a diameter within ±10% of the most common diameter. For example, in the case of a basic anion exchanger with beads having a most common diameter of 0.50 mm, at least 90% by volume or 90% by mass are within a size range between 0.45 mm and 0.55 mm or, in the case of a basic anion exchanger with beads having a most common diameter of 0.70 mm, at least 90% by volume or 90% by mass are within a size range between 0.77 mm and 0.63 mm.

In the present application, the term heterodisperse describes all particle distributions in which the particles are not distributed according to the definition of a monodisperse distribution.

Preference is given to the use of monodisperse basic anion exchangers.

The basic anion exchangers may contain primary, secondary or tertiary amine groups and/or quaternary ammonium groups. Preferably, the basic anion exchangers contain primary and/or secondary amino groups. More preferably, the basic anion exchangers contain primary amino groups. Even more preferably, the basic anion exchangers are crosslinked styrene/divinylbenzene polymers functionalized with primary and/or secondary amino groups, preferably macroporous polymers. Most preferably, the basic anion exchangers are macroporous crosslinked styrene/divinylbenzene polymers functionalized with primary amino groups.

The basic anion exchangers used in the mixtures according to the invention preferably have a mean particle diameter of 200 µm to 650 µm.

The functionalization of the polymers obtainable according to the prior art to form basic anion exchangers having primary, secondary and/or tertiary amino groups or quaternary ammonium groups is likewise known from the prior art to those skilled in the art.

The functionalization can be achieved, for example, by the so-called phthalimide process, in which the crosslinked polymer is first amidomethylated with phthalimide derivatives and the amidomethylated polymer subjected to alkaline hydrolysis to form a basic anion exchanger having primary amino groups: This can then undergo alkylation to form basic anion exchangers having secondary and/or tertiary and/or quaternary amino groups.

Functionalization by the phthalimide process likewise forms part of the prior art and is described for example in EP-B-1078688.

Functionalization can, however, likewise be achieved by chloromethylation and subsequent amination. Thus, for the preparation of basic anion exchangers having primary and/or secondary amino groups, the chloromethylated bead polymer is reacted with ammonia, a primary amine, such as methylamine or ethylamine, or a secondary amine, such as dimethylamine.

For the preparation of basic anion exchangers having tertiary amino groups, chloromethylation or functionalization by the phthalimide process is followed by reaction with tertiary amines. Suitable tertiary amines are trimethylamine, dimethylaminoethanol, triethylamine, tripropylamine, and tributylamine. The tertiary amino groups can then be converted by alkylation into quaternary amino groups. Chloromethylation is described, for example, in EP-B-100660.

The concentration of the functional primary and/or secondary and/or tertiary and/or quaternary amino groups is typically and preferably 0.2 to 3.0 mol/l based on the molar amount of total polymer, but could also be higher or lower. The concentration of the functional primary and/or secondary and/or tertiary and/or quaternary amino groups in the basic anion exchanger is preferably 1.5 to 2.5 mol/l based on the molar amount of total polymer.

Macroporous basic anion exchangers are preferably prepared by the so-called phthalimide process, by a) conversion of droplets of a monomer composed of at least one monovinyl aromatic compound and at least one polyvinyl aromatic compound plus a porogen and at least one initiator into a macroporous crosslinked polymer, b) amidomethylation of the resulting macroporous crosslinked polymer with phthalimide derivatives, and c) conversion of the amidomethylated polymer into a basic anion exchanger having primary aminomethyl groups.

Suitable initiators include, for example, peroxy compounds such as dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azo compounds such as 2,2'-azobis(isobutyronitrile) or 2,2'-azobis(2-methylisobutyronitrile).

The initiators are generally used in amounts of 0.05 to 2.5% by weight, preferably 0.1 to 1.5% by weight, based on the monomer mixture.

Porogens are employed as additional additives in step a) in order to generate a macroporous structure in the polymer. Suitable porogens include organic solvents in which the polymer that is formed dissolves/swells only poorly (precipitants for polymers). Examples are hexane, octane, isooctane, isododecane, methyl ethyl ketone, butanol or octanol, and isomers thereof. Preference is given to the use of isododecane as porogen.

After their preparation, basic anion exchangers are typically present in aqueous solution. The water content can be adjusted as appropriate by drying. Conversely, the water content of the basic anion exchangers can likewise be introduced through contact with a humidified gas stream. Preference is given to adjustment of the water content by drying.

The water content in the resin can be determined using a drying balance. This means that the wet resin is heated with infrared light until it registers no further decrease in mass or has reached the desired water content. The amount of residual water can be calculated from this. If the water content is to be determined during the adsorption of acidic gases, this is generally determined from the mass balance after breakthrough of to water vapor, calculated from the total amount of water and the water content of the resin.

The water content of the basic anion exchangers is preferably from 0% by weight to 40% by weight, more preferably from 1% by weight to 40% by weight, based on the total mass of the basic anion exchanger.

More preferably, the water content of the basic macroporous anion exchangers having primary amino groups is from 1% by weight to 40% by weight based on the total mass of the basic anion exchanger.

The flow regulators are present in particle form. These particles have a diameter between 1 nm and 1000 μm. Generally, the flow regulators used may be any compound that is able to reduce interparticle adhesive forces and ensure continuous flow of the bulk material. Preferred examples of flow regulators that may be used include silicon dioxides, more preferably colloidal silicon dioxide, silicas, preferably fumed silicas, for example Aerosil®, magnesium and aluminum silicates, preferably talc or sodium aluminosilicate, calcium silicate, cellulose, in particular powdered and microcrystalline cellulose, starch, sodium benzoate, calcium carbonate, magnesium carbonate, metal stearate, calcium stearate, magnesium stearate, zinc stearate, magnesium lauryl sulfate and magnesium oxide, and carbon black, in particular gas black, lamp black, thermal black, acetylene black, and furnace black, graphite, and mixtures of said compounds. Preference is given to the use as flow regulators of graphite and silicas, in particular fumed silica (Aerosil®), and mixtures of said compounds. Particular preference is given to the use of silica or graphite.

The mean particle diameter of the flow regulator is preferably from 1 nm to 500 μm, more preferably from 5 nm to 100 μm. Most preferably, the mean particle diameter of the flow regulator is from 5 nm to 50 nm if silica is used as a flow regulator and from 30 μm to 100 μm if graphite is used as a flow regulator.

As a rule, the amount of flow regulator used based on the total mass of the mixture is in the range from 0.01% by weight to 10% by weight, but may be lower or higher. The amount of flow regulator used based on the total mass of the mixture is preferably 0.01% by weight to 10% by weight, more preferably 0.01% to 1% by weight. The amount of dry or wet basic anion exchanger used is preferably between 90% and 99.99% by weight, in which case the amount of flow regulator is preferably 0.01% by weight to 10% by weight based on the total mass of the mixture.

The mixture contains preferably 90% by weight of basic anion exchangers and flow regulators and optionally water, especially 90.1% by weight of basic anion exchangers and flow regulators and optionally water, more preferably 99% by weight, and most preferably 100% by weight, based on the total amount of the mixture. The mixture containing basic anion exchangers and flow regulators preferably contains additionally water.

The mixtures according to the invention are preferably produced by mixing the flow regulator and the basic anion exchangers in the required amounts in a laboratory drum mixer.

The mixtures according to the invention are used for the adsorption of acidic gases, and for the adsorption of carbon dioxide in particular, in a continuous process.

Preferred examples of acidic gases in the context of the present invention include carbon monoxide (CO), carbon dioxide ($CO_2$), nitrous gases, for example nitric oxide (NO), nitrogen dioxide ($NO_2$), nitrous oxide ($N_2O$), dinitrogen pentoxide ($N_2O_5$), sulfur oxides, for example $SO_2$ or $SO_3$, gaseous hydrogen halides, for example HCl, HBr, but also $H_2S$, cyanogen or phosgene.

A particularly preferred acidic gas in the context of the present invention is carbon dioxide.

In order to be able to use the mixtures according to the invention for the adsorption of acidic gases in a continuous process, it is preferable to dissipate the heat evolved during adsorption. This can be done in heat exchangers, preferably in bulk heat exchangers. Examples of bulk heat exchangers are moving-bed heat exchangers, shell-and-tube heat exchangers with continuous through-flow of the bulk material or screw heat exchangers. It is generally possible to operate any type of heat exchanger that allows continuous through-flow of the bulk material in a continuous process, with dissipation/absorption of heat through circulation of a heating medium/coolant.

The adsorption of the acidic gas on the basic anion exchanger of the mixture according to the invention accordingly takes place in the heat exchanger. For this, the gas may be fed through the heat exchanger in cocurrent or countercurrent. Preference is given to the passage of the gas through the heat exchanger, and through the mixture according to the invention, in countercurrent. Typically, the gas flows through the heat exchanger at a rate of 0.01 m/s to 10 m/s. Preferably, the gas flows through the heat exchanger at a rate of 0.01 m/s to 1 m/s. The continuous flow of the mixture according to the invention can be achieved through compressed air or through pressurization with inert gases, but also through gravity. The mixture according to the invention preferably moves through the heat exchanger through gravity. If pressure needs to be externally applied, this pressure is preferably in the range between 1 mbar to 1 bar. Typically, the mixture according to the invention flows through the heat exchanger at a rate of 0.001 m/s to 100 m/s. Preferably, the mixture according to the invention flows through the heat exchanger at a rate of 0.01 m/s to 10 m/s. Adsorption generally takes place at a temperature of 5° C. to 90° C., with the temperature being dependent on the position of the mixture according to the invention in the heat exchanger. The preferred outflow temperature of the gas from the heat exchanger is 5° C. to 70° C.

On flowing through the bed, the gas molecules bind to the amino functional groups on the external and internal surfaces of the basic anion exchangers, with corresponding depletion of the medium flowing through. The regeneration of the basic anion exchangers with acidic gases can be done in a number of ways; the chosen mode of regeneration depends on use in the individual case and on other technical and logistical constraints. Preferred examples include in particular those listed below:

Regeneration of basic anion exchangers loaded with acidic gases by application of steam and consequent expulsion of the adsorbed gas.

Regeneration of basic anion exchangers loaded with acidic gases by application of an underpressure with or without additional application of heat (e.g. as steam) and/or hot gases, for example nitrogen, air or inert gases, for example helium or argon, and consequent expulsion of the adsorbed gas.

Regeneration of basic anion exchangers loaded with acidic gases by application of heated or unheated $CO_2$-free air and consequent expulsion of the adsorbed gas.

The invention therefore also includes a continuous process for the adsorption of acidic gases, in which a heat exchanger containing the mixtures according to the invention undergoes through-flow of a gas stream containing acidic gases in a step a) and in a further step b) the basic anion exchanger is regenerated again in the mixtures according to the invention.

The gas stream here may be, for example, an industrial gas, for example flue gas, or offgas from burning hydrocarbons, natural gas, synthesis gas, cracked gas or biogas.

The gas stream generally contains 10% by volume to 60% by volume of acidic gases. The gas stream used in the process according to the invention preferably contains 20% by volume to 50% by volume of acidic gases based on the total mass of mixture according to the invention that is used.

The gas stream preferably contains 0% by volume to 40% by volume of water. More preferably, the water content of the gas stream is 0% by volume to 20% by volume.

The invention therefore also comprises the use of the mixture according to the invention for the adsorption of acidic gases and of carbon dioxide in particular. In addition, the invention comprises heat exchangers containing the mixture according to the invention.

The mixture according to the invention is suitable for use in a continuous process for the adsorption of acidic gases. In this process, not only may it be used to dissipate heat, but in particular it prevents the blockage of the inflow and outflow lines of the heat exchangers.

EXAMPLES

Example 1

Improvement in Flow Properties

The improvement in the experimentally observed flowability is expressed by the Hausner ratio. The Hausner ratio describes the flowability of a bulk material and is used primarily in pharmacy. It is defined as:

$$A = \frac{\rho_{Tapped}}{\rho_{Bulk}} = \frac{V_{Bulk}}{V_{Tapped}}$$

where $\rho_{Tapped}$ is the tapped density and $\rho_{Bulk}$ the bulk density, $V_{Bulk}$ the bulk volume, and $V_{Tapped}$ the tapped volume. The closer the Hausner ratio is to 1, the better the flowability of the corresponding bulk material.

In an experiment to measure the improvement in the flowability of the bulk material, 400 ml (212 g) of dried macroporous basic anion exchanger composed of a styrene/divinylbenzene copolymer with primary amino groups and having a residual water content of <10% was mixed with graphite and respectively with Aerosil® 200. The mean particle diameter of the anion exchangers used is 470 µm to 570 µm. The mean particle diameter of the flow regulator was 12 nm when fumed silica (Aerosil®) was used. The particle size of 85% of the graphite used was <75 µm. The amount of flow regulator that was added was between 0.01% by weight-10% by weight. The mixture of ion exchanger and flow regulator was then mixed for 2 h at a low rotation speed in a laboratory drum mixer, for example a Lödige L 5 laboratory mixer.

After this, 100 ml of the macroporous basic anion exchanger mixed with flow regulator was transferred to a 100 ml measuring cylinder and the bulk density determined by weighing. The tapped density of the mixture was then measured using a JEL STAV 2003 jolting volumeter. This was done by applying 1250 taps with the jolting volumeter and then determining the volume of the mixture. The tapped volume and tapped density were determined in accordance with the pharmacopeial method "2.9.15 Bulk Volume/Tapped Volume" (Ph. Eur. 6th Edition). The ratio between the bulk density and tapped density was used to calculate the Hausner ratio and the optimized range for the amount of graphite or Aerosil® flow regulator to be added was determined as 0.01% by weight to 10% by weight.

In addition to determining the flow-improving properties of graphite and Aerosil® on the improvement in flow properties, the effects on the adsorption capacity of the employed macroporous basic anion exchanger composed of a styrene/divinylbenzene copolymer bearing primary amino groups were also investigated. For the two flow regulators, addition of 0.01% by weight-10% by weight was found to have no adverse effect on the adsorption properties of the anion exchanger.

The improvement in the adsorption capacity was confirmed by an adsorption isotherm measurement.

BRIEF DESCRIPTION OF THE DRAWINGS

FIG. 1 shows the adsorption isotherms of the inventive mixture of a macroporous basic anion exchanger comprising a styrene/divinylbenzene copolymer having primary amino groups and 0.4% by weight of graphite.

Example 2

Improvement in Adsorption Properties

The dependence of the adsorption capacity on the temperature of the material used was determined by measurement of a number of adsorption isotherms at different temperatures. In the measurement described below, the macroporous crosslinked basic anion exchanger composed of a styrene/divinylbenzene copolymer bearing primary amino groups from example 1 was used as a mixture with graphite.

The adsorption isotherms were determined by measurement of the adsorption capacity of the acidic gas $CO_2$ at different temperatures and $CO_2$ concentrations (see FIG. 1 and Table 1). For this, 15 ml (8 g) of dried macroporous basic anion exchanger composed of a styrene/divinylbenzene copolymer bearing primary amino groups and containing 0.32 g of graphite (mean particle diameter<75 µm) in a temperature-controlled column was subjected to a gas flow of 5% by volume to 50% by volume of $CO_2$ and a number of breakthrough curves were measured for $CO_2$ at 10° C. to 90° C. (see FIG. 1). The mean particle diameter of the anion exchangers used is 470 µm to 570 µm. Integration of the recorded breakthrough curves allowed the amount of $CO_2$ adsorbed to be calculated. FIG. 1 and Table 1 show a number of adsorption isotherms for the mixture according to the invention at different temperatures. These show clearly that with increasing adsorption temperature there is an associated marked decrease in $CO_2$ adsorption capacity. The use of the mixture according to the invention in a heat exchanger allows acidic gases, in particular $CO_2$, to be adsorbed even at low temperatures, which means that higher adsorption capacities may be used. In the absence of a flow regulator, the adsorption needs to be carried out at considerably higher temperatures at which the adsorption capacity of the ion exchanger is considerably lower, since otherwise it is no longer possible to adequately dissipate the heat in the heat exchanger and the ion exchanger will become damaged with more protracted use.

TABLE 1

Results of the experiments: Adsorption capacities at different temperatures and $CO_2$ concentrations according to the isotherms in FIG. 1

| $CO_2$ concentration [% by volume] | Temperature | | | | | |
|---|---|---|---|---|---|---|
| | 10° C. | 20° C. | 40° C. | 60° C. | 80° C. | 90° C. |
| | Capacity [mol/kg] | | | | | |
| 5 | 2.90 | | 2.00 | 1.50 | 1.10 | 0.90 |
| 10 | 3.10 | 2.55 | 2.20 | 1.75 | 1.40 | 1.10 |
| 20 | 3.25 | 2.75 | 2.40 | 2.00 | 1.80 | 1.25 |
| 30 | 3.25 | 2.80 | 2.55 | 2.25 | 1.55 | 1.35 |

TABLE 1-continued

Results of the experiments: Adsorption capacities at different temperatures and $CO_2$ concentrations according to the isotherms in FIG. 1

| $CO_2$ concentration [% by volume] | Temperature | | | | | |
|---|---|---|---|---|---|---|
| | 10° C. | 20° C. | 40° C. | 60° C. | 80° C. | 90° C. |
| | | | Capacity [mol/kg] | | | |
| 40 | 3.35 | 2.70 | 2.50 | 2.20 | 1.60 | 1.40 |
| 50 | 3.50 | 3.10 | 2.60 | 2.25 | 1.75 | 1.35 |

What is claimed is:

1. A mixture comprising:
at least one basic anion exchanger having a water content of 0% by weight to 60% by weight based on the total mass of the ion exchanger and having a mean particle diameter of 100 to 1000 µm and at least one flow regulator that is different than the basic anion exchangers wherein said flow regulator has a mean particle diameter of 1 nm to 1000 µm.

2. The mixture as claimed in claim 1, wherein the anion exchanger is macroporous.

3. The mixture as claimed in claim 1, wherein the anion exchanger comprises primary amino groups.

4. The mixture as claimed in claim 1, wherein the anion exchanger has a water content of 01% to 40% based on the total mass of the basic anion exchanger.

5. The mixture as claimed in claim 1, wherein the basic anion exchanger comprises a macroporous crosslinked styrene/divinylbenzene polymer functionalized with primary amino groups.

6. The mixture as claimed in claim 1, wherein the flow regulators has a mean particle diameter of 1 nm to 500 µm.

7. The mixture as claimed in claim 1, wherein the flow regulators is selected from the group of silicon dioxides, colloidal silicon dioxide, silicas, fumed silicas, magnesium and aluminum silicates, talc or sodium aluminosilicate, calcium silicate, cellulose, powdered and microcrystalline cellulose, starch, sodium benzoate, calcium carbonate, magnesium carbonate, metal stearate, calcium stearate, magnesium stearate, zinc stearate, magnesium lauryl sulfate and magnesium oxide, and carbon black, gas black, lamp black, thermal black, acetylene black, and furnace black, graphite, and mixtures of said compounds.

8. The mixture as claimed in claim 1, wherein the flow regulators is graphite, silica or mixtures of said compounds.

9. The mixture as claimed in claim 8, wherein the mean particle diameter is 30 µm to 100 µm and 5 nm to 50 nm for graphite and silica, respectively.

10. The mixture as claimed in claim 1, wherein the mixture contains 0.01% to 10% by weight of the flow regulator and 90% by weight to 99.99% of the basic anion exchanger, based on the total mass of the mixture, wherein the basic anion exchanger is either dry or wet.

11. A continuous process for the adsorption of acidic gases, comprising:
providing a heat exchanger containing the mixtures as claimed in claim 1,
flowing of a gas stream containing acidic gases through the heat exchanger, and
subsequently regenerating the basic anion exchanger into the mixtures as claimed in claim 1.

12. The process according to claim 11, wherein the acidic gases comprise carbon dioxide.

13. A heat exchanger containing the mixture as claimed in claim 1.

* * * * *